United States Patent [19]
Laidler

[11] Patent Number: 5,608,792
[45] Date of Patent: Mar. 4, 1997

[54] APPARATUS FOR DRAWING AND PROCESSING ELECTRICAL POWER FROM A COMMUNICATIONS LINE

[75] Inventor: Graham A. Laidler, Ipswich, England

[73] Assignee: British Telecommunications public limited company, London, England

[21] Appl. No.: 251,686

[22] Filed: May 31, 1994

[30] Foreign Application Priority Data

Apr. 13, 1994 [EP] European Pat. Off. ............. 94302621

[51] Int. Cl.$^6$ ................................................. H04M 19/00
[52] U.S. Cl. ........................... 379/386; 363/21; 379/322; 379/387; 379/413
[58] Field of Search ........................ 379/386, 387, 379/322, 413, 350, 399, 324, 323; 363/21

[56] References Cited

U.S. PATENT DOCUMENTS

| | | | |
|---|---|---|---|
| 5,144,544 | 9/1992 | Jenneve et al. | 379/413 |
| 5,157,711 | 10/1992 | Shimanuki | 379/413 |
| 5,161,184 | 11/1992 | Smith et al. | 379/387 |
| 5,204,896 | 4/1993 | Oliver | 379/106 |
| 5,216,707 | 6/1993 | Davenport | 379/413 |
| 5,237,606 | 8/1993 | Ziermann | 379/413 |
| 5,241,591 | 8/1993 | Saji | 379/413 |
| 5,289,359 | 2/1994 | Ziermann | 379/413 |
| 5,343,514 | 8/1994 | Snyder | 379/413 |
| 5,349,640 | 9/1994 | Dunn et al. | 379/387 |
| 5,396,555 | 3/1995 | Shibata et al. | 379/413 |

FOREIGN PATENT DOCUMENTS 0214915  3/1987  European Pat. Off. ....... H04M 11/00

OTHER PUBLICATIONS

Patent Abstracts of Japan, vol. 13, No. 88 (E-721) 28 Feb. 1989 & JP-A-63 266 956 (NEC Corp).
Patent Abstracts of Japan, vol. 15, No. 98 (E-1042) & JP-A-02- 306 754 (Nippon Telegraph & Telephones Corp.) 20 Dec. 1990.
Becker et al, "Sigfred: A Low-Power DTMF and Signaling Frequency Detector", IEEE Journal of Solid-State Circuits, vol. 26, No. 7, Jul. 1991, New York US, pp. 1027–1037, XP237045.

*Primary Examiner*—Ahmad F. Matar
*Assistant Examiner*—Scott Wolinsky
*Attorney, Agent, or Firm*—Nixon & Vanderhye P.C.

[57] ABSTRACT

Apparatus powered from a communications line minimizes current drawn from the line by use of a variable power supply having a DC to DC conversion circuit controlled by an oscillator. The output of the DC to DC conversion circuit in a first lower power drawing mode is used to power a tone detection circuit which monitors the line for a wake-up tone. On receipt of an appropriate wake-up tone, the tone detection circuit provides an interrupt signal to a microprocessor which, in response, causes an increase in the oscillator frequency. The increased oscillator frequency then increases power drawn from the line via the DC to DC conversion circuit for operation in a second higher power drawing mode.

20 Claims, 4 Drawing Sheets

5,608,792

APPARATUS FOR DRAWING AND PROCESSING ELECTRICAL POWER FROM A COMMUNICATIONS LINE

BACKGROUND OF THE INVENTION

1. Field of the Invention

The present invention relates to apparatus for connection to a communications line and more particularly, but not exclusively, to power supply circuits for use with line powered telecommunications apparatus. The invention also relates to interrupt monitoring circuits included in such apparatus.

2. Related Art

Telephones, particularly those with features such as amplification, are known to draw line current for powering from the telephone line. These circuits are only active when a telephone is in the "off-hook" condition and do not usually draw current when not in use.

Apparatus, such as facsimile transmission and receiving apparatus or telephone answering machines, which include monitoring circuits normally require relatively high power and include battery or mains electricity power supply sources.

As may be appreciated the 'A' and 'B' wires of a telephone line in the quiescent state have a voltage difference of approximately fifty volts D.C. in United Kingdom telephone exchanges. This voltage is provided so that a telephone line circuit in the exchange can detect looping of the line by a customer instrument by virtue of the current drawn. Such detection will occur if, say, a current of twenty milliamps or greater is drawn, but some circuits, particularly for longer lines, may be made more sensitive.

Thus if a telephone company wishes to provide line-powered apparatus, for example for telemetry applications, the current drawn from the telephone line must be less than the loop detection at lower current limit. Further, since energy consumption is not without cost, if every telephone line draws current in the quiescent state, such current draw must be minimized.

BRIEF SUMMARY OF THE INVENTION

Accordingly, the present invention seeks to provide power supply circuits and interrupt monitoring circuits which have minimal current draw in the quiescent state but which are capable of providing higher power when required. According to the present invention there is provided apparatus for connection to a communications line including a D.C. to D.C. converter 9 connected to receive power from line terminals, the converter having a first lower power mode of operation and a second higher power mode of operation, said converter powering a detector arranged for detecting the presence of a predetermined activation signal on the communications line characterized in that upon detection of such a signal the converter is switched from the first mode to the second mode.

Preferably the D.C. to D.C. converter 9 includes an oscillator and a transformer, the oscillator being arranged to cause D.C. level switching to a primary winding of the transformer such that power transfer from the communications line to other circuits occurs, the change from the first mode of operation to the second mode being effected by causing an increase in the frequency of the oscillator.

BRIEF DESCRIPTION OF THE DRAWINGS

An interrupt monitoring circuit including a power supply circuit in accordance with the invention will now be described by way of example only with reference to the accompanying drawings of which.

DETAILED DESCRIPTION OF EXEMPLARY EMBODIMENTS

Figure 1:
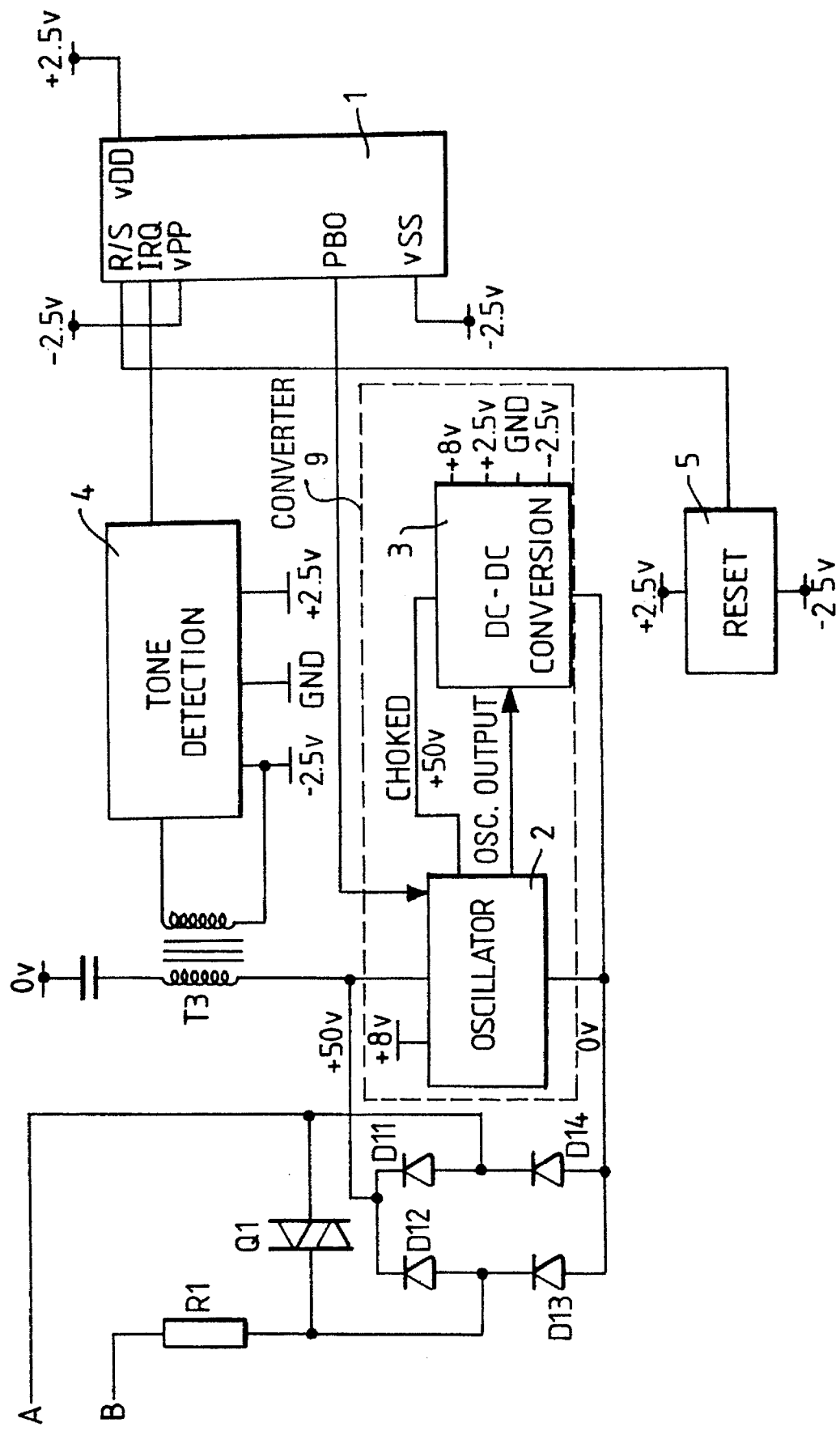
FIG. 1 is a block schematic diagram of a part of a telemetry monitoring apparatus.

Referring first to FIG. 1, the telemetry monitoring apparatus uses a programmed microprocessor 1 to respond to signals received over a telephone line (A, B). Most connections of the microprocessor 1 are not shown since they relate to functions which are not relevant to the present invention.

In the quiescent state, that is when no telemetry function is taking place, the microprocessor 1 remains in a low power standby mode pending receipt of an interrupt signal at input IRQ.

A tone detection circuit 4 monitors the telephone line A, B for a designated wake-up tone (or tones). Further detail of the operation of the line detection circuit may be found hereinafter.

The tone detection circuit 4 is supplied with power from a DC to DC conversion circuit 3 switching for which is provided by an oscillator circuit 2. All power for the circuit 3 is drawn from the telephone line A, B by way of a bridge rectifier circuit comprising diodes D11–D14. The bridge circuit ensures that, regardless of the polarity of the telephone exchange voltage on the A and B legs of the telephone line, the plus fifty volt and zero volt lines are consistent. The Diodes D11–D14 may be of type IN4003. Back to back diodes Q1 insure against overvoltage.

A ten ohm resistor R1 prevents excess current being drawn from the telephone line in the event of a short circuit occurring.

Figure 2:
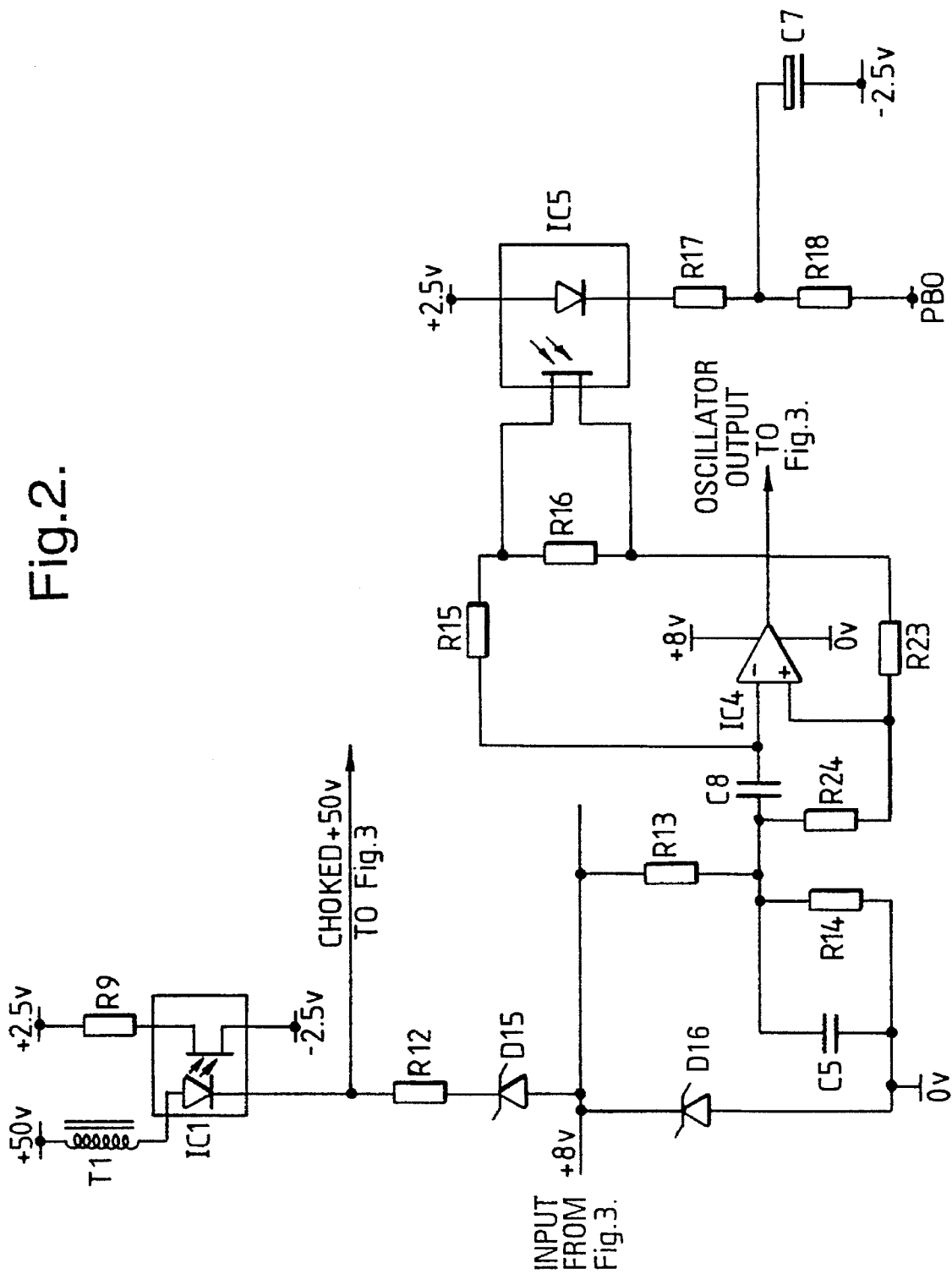
FIG. 2 is a circuit diagram of the oscillator circuit of FIG. 1.

Referring also to FIG. 2, a ten henry inductance T1 prevents tones on the A and B legs being sunk by the oscillator which comprises an operational amplifier, IC4, with both positive and negative feedback loops which vary the frequency of output square wave. Once the oscillator circuit 2 is running, an 8 volt line is provided from the DC-DC conversion circuit 3. However, in order to start the power supply on first connection the eight volt line is linked by a 47 k ohm resistor R12 and a 39 V zener diode D15 (type BZX8-539 V) to the fifty volt line. When the eight volt line is supplied from the DC-DC conversion circuit 3 as hereinafter described, the diode D15 thus limits current drawn direct from the plus 50 volt supply. Additionally, diode D16 provides overvoltage protection The feedback loop of the Operational Amplifier IC4 (which may be a MAX409BCPA manufactured by Maxim) comprises a ten megohm resistor R23 linked to the positive input which together with a further 10 megohm resistor R24 form a divider which causes the positive input of IC4 to follow the square wave output. The negative input of IC4 is linked to the output by way of resistors R15 and R16 respectively of one megohm and thirty three megohms. Capacitor C8 (ten microfarad) allows the negative input to follow, charging from the voltage divider chain formed from resistors R13, R14 each of 10 Megohm value between the +8 volt and zero volt lines.

Figure 3:
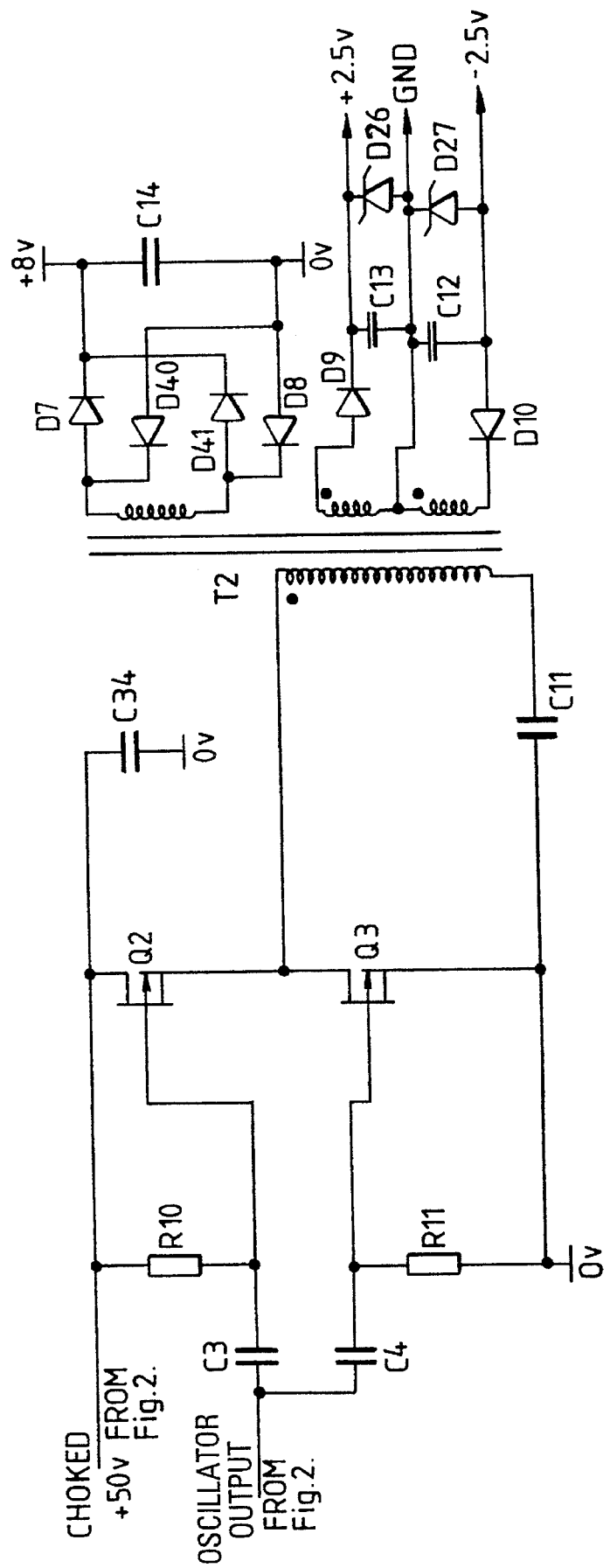
FIG. 3 is a circuit diagram of the DC-DC conversion circuit of FIG. 1.

Still considering the quiescent state and referring also to FIG. 3, the square wave output of the oscillator 2 is fed by way of capacitors C3, C4 each of 680 picofarad value to switches Q2 and Q3. As the capacitor C3 is tied to the +50 volt line by a 220 K ohm resistor R10 and the capacitor C4 to the zero volt line by corresponding resistor R11 the output square wave (which was running at approximately 200 Hz ) becomes a series of positive and negative spikes of 100 micro second duration. Since capacitor C11 (of 1 nanofarad) does not have time to charge the output at the junction of the switches Q2 and Q3 switches between zero and 50 volts.

Thus a trans former T2 which has one thous and turn primary winding and three secondary windings each of one hundred and sixty six turns is caused to transfer power. Although the input is spicate, ringing through the trans former will spread the transfer. A 100 nanofarad decoupling capacitor C34 is provided to the plus 50 V line.

The first secondary winding feeds a full-wave rectifier bridge circuit comprising four diodes D7, D8 and D40, D41 which may be type BAX13 although a half-wave rectifier may be used. A capacitor C14 (ten microfarads) smooths the output which provides a normal 8 volt supply to the oscillator 2. As previously described, the eight volt line biases the diode D15 (FIG. 2) thus causing power for the oscillator to be drawn via the transformer T2 directly from the telephone line A, B.

The other two windings for the trans former T2 effectively provide a center-tapped five volt power supply. A half-wave rectifier circuit comprising diodes D9 and D10 provides plus 2.5 V, Ground and −2.5 V lines. While the diodes D9 and D10 are type BAX13, Diodes D26 and D27 are of the zener type BZX2V7 to limit the output voltage. Capacitors C12 and C13 provide smoothing of the output which supplies power to the microprocessor 1 and tone detector 4 in the quiescent state drawing approximately five microamps from the line AB. For higher power applications it will be realized that a full-wave rectifier bridge may be incorporated.

Figure 4:
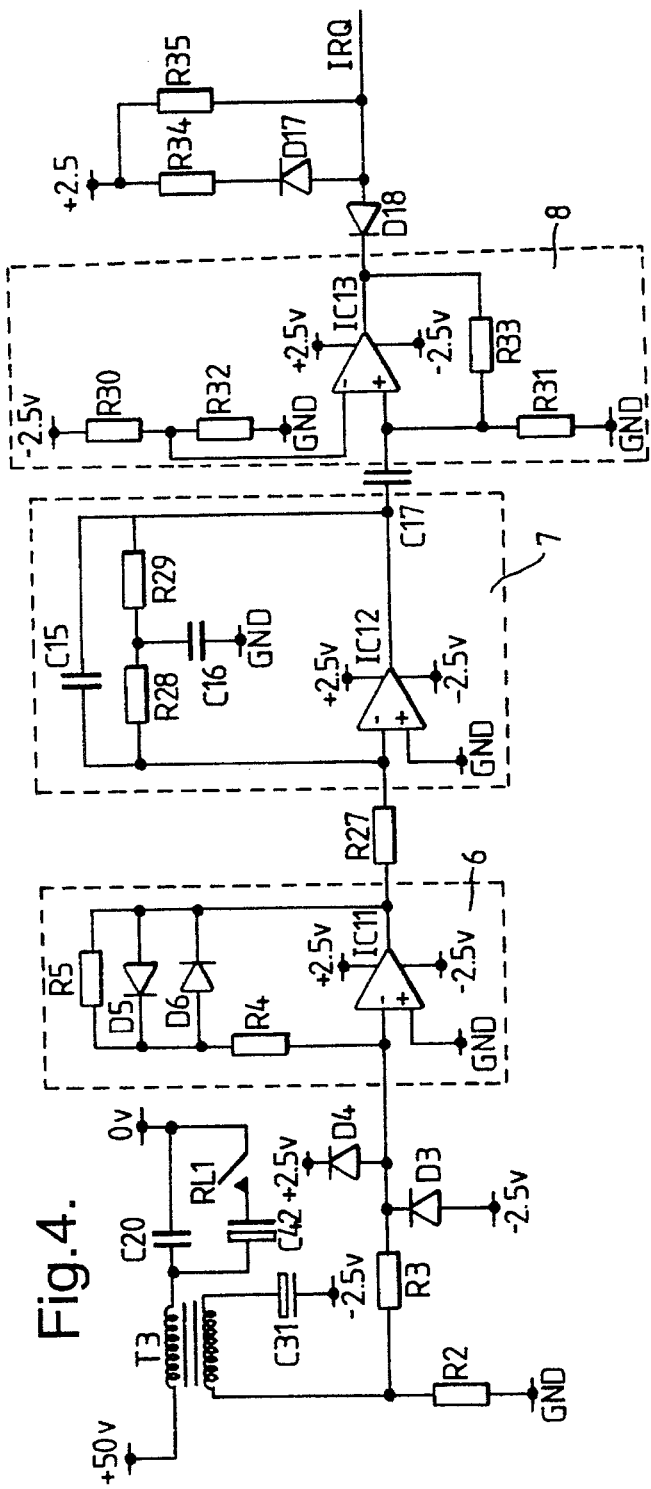
FIG. 4 is a circuit diagram of the tone detection circuit of FIG. 1.

Referring now to FIGS. 1 and 4, the tone detection circuit 4 comprises an automatic gain control (AGC) circuit 6, a band-pass filter 7 and a signal level detector 8.

Incoming tone signals are transferred from the 50 volt live side to the low voltage circuitry by a one to one transformer T3 wherein the primary winding of T3 is coupled to the zero volt line by capacitors C20, C42 and switch RL1. Such tone signals pass to the negative input of an operational amplifier IC11 (which may be of type MAX409BCPA), the signals being biased by a one megohm resistor R2 connected to ground and a one hundred k ohm resistor R3 which is connected to the −2.5 v and +2.5 v lined by diodes D3 and D4, respectively. A 470 nanofarad capacitor C31 completes the circuit to the −2.5 volt line while preventing D.C. flow through R2.

Gain control is provided by a feed back loop comprising 100 k ohm resistor R4 and a one megohm resistor R5 across which diodes D5, D6 (type BAX13) are provided. The diodes D5, D6 will breakdown logarithmical if the output of the operational amplifier IC11 exceeds approximately 0.5 volts. Bypassing the resistor R5 increases the feedback bias on the negative input of the operational amplifier IC11 thus counteracting any high level output by reducing amplification of the output feed.

The gain controlled signal now passes by way of a 1 megohm resistor R27 to the band pass filter 7 and more particularly to the negative input of the op amp IC12 which again may be of type MAX 409BCPA). The filter comprising capacitors C15, C16 and resistors R28, R29 feed back to the input of IC12 and prevent all except a narrow band of signals around the selected wake-up tone frequency being amplified and passed to the signal level detector 8.

In a specific example if the selected frequency ($f_0$) is 493 Hz, C15 may be ten picofarad, C16 one microfarad and R28 and R29 each of one hundred k ohm.

Appropriate to $f_0$ signals pass by way of a 100 nanofarad capacitor C17 to the positive input of an op amp IC13. Biasing of the input by one megohm resistor R31 connected to the ground line and ten megohm resistor R33 connected to the −2.5 volt line to ensure that low level (or accidental) signals do not pass. A small positive feedback by resistor R33 (ten megohms) and R32 (2.2 megohms) provides some hysteresis to the circuit.

An output line IRQ is normally biased to +2.5 volts by a ten megohm resistor R35 in parallel with R34 and diode D17 for bypassing positive pulses. As the op amp IC13 converts an incoming high level tone to a square wave, diode D18 is forward biased causing a falling edge to provide an interrupt signal to the microprocessor 1.

Referring again to FIG. 1, the microprocessor 1 is arranged, on interrupt, to cause its output PBO to go negative. This causes resistor R18 (FIG. 2) to draw current by way of a photon coupled bilateral field-effect transistor IC5 and resistor R17 thus reducing the resistor feedback to the oscillator since IC5 now provides an approximate two hundred ohm bypass of the resistor R16. Capacitor C8 and resistor chain R15, R16 causes the oscillator output to approach a saw-tooth form. The positive input of the op amp IC4 follows a low level square wave provided by the capacitor C5 and resistors R23, R24 forming a divider and the much faster rise time thus provided causes an increase in the frequency of the oscillator 2. This increases the power transferred by the transformer (T2 of FIG. 3) temporarily increasing the power drawn from the telephone line A, B.

This temporary increase in power available allows the microprocessor 1 to carry out an accurate frequency check (approximately plus or minus one Hz) on the tone signal output from IC13 to an input TCAP of the microprocessor. If the tone is no longer present or is not of the required value, the PBO output is returned to normal and the microprocessor returns to the quiescent state pending receipt of a further interrupt via IRQ.

If the signal received is a valid "wake-up" signal another output (not shown) is used to cause a voltage supply rail for other circuits (also not shown) to be connected to the −2.5 volt supply by a transistor switch.

It is here noted that if power demand is maintained, the frequency of the oscillator 2 will increase as capacitor C7 discharges such that the input to the transformer T2 approaches a high frequency square wave—having a period which approaches the duration of the spike output of the oscillator in the quiescent state.

For first connection or reconnection or in case the occurrence of low or zero voltage for other reasons may have caused the microprocessor 1 to enter an untenable state, a reset circuit 5 (FIG. 1) is responsive to rising voltage to provide a reset signal. The reset signal (received at input R/S) will cause the microprocessor 1 to "re-boot" in known manner.

Figure 5:
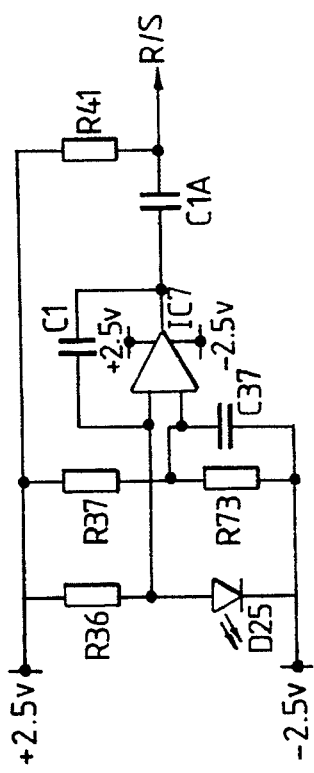
FIG. 5 is a circuit diagram of the reset circuit of FIG. 1.

Thus referring to FIG. 5, an operational amplifier IC7 is normally held switched off by biasing provided by resistors R37 (10 megohm), R73 (5.6 megohm) and R36 (4.7 megohm). As the + and −2.5 V line voltages produced by IC1 and current limiting resistor R9 of FIG. 2 increase from zero, diode D25 conducts causing in combination with feedback capacitor C1 a change in the voltage on the positive input pending recharging of capacitor C37. This causes the output of IC7 to change which change shows as a voltage edge passing through C1A causing the R/S bias (provided by way of a 10 megohm resistor R41) to change. This provides the reset signal to the microprocessor 1.

It will be appreciated that the single tone detection circuit comprises of the filter 7 and level detector 8 may be modified to detect dual or multiple tone activation signals. Thus, for example, for DTMF type signalling a second appropriately tuned filter may be added at the output of the AGC circuit 6.

While as herein described zener diodes have been used equivalent components of the type known as silicon stabilizer diodes may be used in place thereof. The use of silicon stabilized diodes in place of zener diodes has been shown to decrease the power consumption of the circuit.

I claim:

1. Apparatus for drawing and processing electrical power from a telephone line, the apparatus comprising:

a pair of terminals for connection to the telephone line, a signal detector coupled to the terminals;

a DC to DC converter connected to receive power from the terminals and to power the signal detector for detecting the presence of a predetermined activation signal on the telephone line, the converter comprising an oscillator and a transformer with primary and secondary windings, the oscillator having an output connected to a primary winding of the transformer and causing DC level switching thereto such that power transfer from the telephone line to a secondary winding of the transformer occurs, and the signal detector, on detection of the activation signal, causing an increase in oscillator frequency to cause an increase in the power transferred.

2. Apparatus as in claim 1 in which said signal detector further comprises processor means, and in which:

the signal detector comprises a gain control circuit, a band pass filter and a level detector, the band pass filter limits signals passed to the level detector to a predetermined band, and the level detector provides a signal to cause the processor means to activate when the predetermined activation signal reaches a predetermined level.

3. Apparatus as in claim 2 in which said signal detector further comprises at least one additional band pass filter tuned to pass other frequencies to the level detector whereby the processor means is only activated if a predetermined plurality of activation signals are detected.

4. Apparatus as in claim 2 in which the processor means comprises comparison means to check the validity of the activation signal and output means to cause the oscillator frequency to be increased.

5. Apparatus as in claim 4 further comprising output terminals for connection to communications apparatus, the processor means causing power to be provided from the transformer to the output terminals if the comparison means confirms the validity of the activation signal.

6. Apparatus as in claim 1 in which detection of the activation signal causes the output of the oscillator to change from a series of positive and negative voltage spikes to an approximate square wave signal.

7. Apparatus as in claim 6 in which the transformer has a plurality of secondary windings, a first of said secondary windings providing output power to drive the oscillator and a second of said secondary windings providing output power to the detector.

8. Apparatus as in claim 7 in which said second of said secondary windings comprises a balanced pair of secondary windings.

9. Apparatus as in claim 6 in which said signal detector further comprises processor means, and in which:

the signal detector comprises a gain control circuit, a band pass filter and a level detector, the band pass filter limits signals passed to the level detector to a predetermined band, and the level detector provides a signal to cause the processor means to activate when the predetermined activation signal reaches a predetermined level.

10. Apparatus as in claim 9 in which said signal detector further comprises at least one additional band pass filter tuned to pass other frequencies to the level detector whereby the processor means is only activated if a predetermined plurality of activation signals are detected.

11. Apparatus as in claim 9 in where the processor means comprises comparison means to check the validity of the activation signal and output means to cause the oscillator frequency to be increased.

12. Apparatus as in claim 11 further comprising output terminals for connection to communications apparatus, the processor means causing power to be provided from the transformer to the output terminals if the comparison means confirms the validity of the activation signal.

13. Apparatus as in claim 1 in which the transformer has a plurality of secondary windings, a first of said secondary windings providing output power to drive the oscillator and a second of said secondary windings providing output power to the detector.

14. Apparatus as in claim 13 in which said second of said secondary windings comprises a balanced pair of secondary windings.

15. Apparatus as in claim 13 in which said signal detector further comprises processor means, and in which:

the signal detector comprises a gain control circuit, a band pass filter and a level detector, the band pass filter limits signals passed to the level detector to a predetermined band, and the level detector provides a signal to cause the processor means to activate when the predetermined activation signal reaches a predetermined level.

16. Apparatus as in claim 15 in which said signal detector further comprises at least one additional band pass filter tuned to pass other frequencies to the level detector whereby the processor means is only activated if a predetermined plurality of activation signals are detected.

17. Apparatus as in claim 15 in which the processor means comprises comparison means to check the validity of the activation signal and output means to cause the oscillator frequency to be increased.

18. Apparatus as in claim 17 further comprising output terminals for connection to communications apparatus, the processor means causing power to be provided from the transformer to the output terminals if the comparison means confirms the validity of the activation signal.

19. A telephone line powered processor comprising:

telephone line connection terminals for connection to telephone lines;

an oscillator having an oscillator frequency control input;

a DC-to-DC conversion circuit connected to be driven and controlled by said oscillator, said DC-to-DC conversion circuit being connected to draw and process electrical power from said terminals and to provide a supply of processed electrical power to output terminals; and an activation signal detector having an input coupled to said telephone line connection terminals, said activation signal detector detecting the presence of a predetermined activation signal on said telephone lines and an output of said activation signal detector being connected to said oscillator frequency control input for controlling the frequency of the oscillator.

20. A telephone line powered processor as in claim 19 wherein said activation signal detector includes a microprocessor having an input terminal responsive to a detection of the predetermined activation signal on the telephone line for providing said output to the oscillator frequency control input.

* * * * *